United States Patent

Chase

[15] 3,651,558

[45] Mar. 28, 1972

[54] METHOD OF REPAIRING A CERAMIC-LINED NOZZLE

[72] Inventor: Raymond Burt Chase, Midland, Mich.

[73] Assignee: The Dow Chemical Company, Midland, Mich.

[22] Filed: June 8, 1970

[21] Appl. No.: 35,558

Related U.S. Application Data

[63] Continuation-in-part of Ser. No. 726,034, May 2, 1968, abandoned.

[52] U.S. Cl. ................29/401, 52/514, 220/64, 285/417
[51] Int. Cl. .................B22d 19/10, B23p 7/00
[58] Field of Search..............220/64; 285/417; 52/514; 29/401

[56] References Cited

UNITED STATES PATENTS

| | | | |
|---|---|---|---|
| 2,725,159 | 11/1955 | Sanford | 220/64 |
| 3,010,601 | 11/1961 | Holtz | 220/64 |

Primary Examiner—John F. Campbell
Assistant Examiner—Donald C. Reiley, III
Attorney—Griswold and Burdick and Albin R. Lindstrom

[57] ABSTRACT

In a glass or ceramic-lined reactor vessel for use with corrosive contents, to repair major damage of a nozzle, damaged portions of the nozzle are first removed as by cutting torch, the remaining nozzle neck wall is edge-tapered for welding, a replacement nozzle opening comprising a flange is provided and attached by welding inside and out, any surplus inside bead or rod slag being brought to a conforming surface; the nozzle and adjacent portions of the reactor vessel are sheathed with a metal cover, the metal being from one-eighth to one-half inch, both inclusive, in thickness, and being such as is substantially inert under the conditions of use of the equipment being repaired; the cover comprising essentially an outer face disc and an inner face disc each defining a threaded central opening, a tubular nozzle interior sheath, the ends of the nozzle interior sheath and the inner aspects of the openings of the discs being cooperatively threaded; any space otherwise void between repair sheath and nozzle interior surface being filled with a curable resin filler that is inert and insoluble when cured; the nozzle being drawn securely into place and cooperating deformable chemically gaskets being deformingly seated, by tightening of especially the threaded outer face disc onto the threaded tubular sheath.

3 Claims, 6 Drawing Figures

INVENTOR.
Raymond B. Chase
BY
Thomas J. Page 3,651,558

METHOD OF REPAIRING A CERAMIC-LINED NOZZLE

The present application is a continuation-in-part of application Ser. No. 726,034, filed May 2, 1968, and now abandoned.

BACKGROUND OF THE INVENTION

1. Field of the Invention

Many important present-day chemical substances including foodstuffs and medicinal materials can be prepared successfully only through the use of special equipment which does not corrode when in contact with various starting materials, reactants, and products. The use of ceramic or glass-lined equipment has become very widespread in such applications. It gives excellent results, and steel vessels thus lined are very much less expensive than would be comparable vessels made of, for example, nickel, stainless steel, platinum, tantalum, or other metals which are substantially unreactive under most employed conditions. A typical reactor vessel of this sort, of industrial size, is prepared by separately forming the various vessel components such as ends, sidewalls, nozzles and the like; joining them together as by welding, finishing interior and other working surfaces to a satisfactory smoothness, coating these surfaces with a water slurry of a glass frit, often containing clay and other substances that react under the application of heat; permitting the frit slurry to evaporate to dryness, and thereafter firing the frit to obtain a continuous glass coating.

Single such coats tend to manifest "pin-holes"; the presence of such flaws is readily detected by the use of electrical discharge probes; where a pin-hole extends to the metal base beneath the glass or ceramic coating, a spark travels and the position of the pin-hole readily located. Routinely, such vessels are coated with several coats of glass each from its own frit slurry which is, successively, permitted to dry and fired to obtain a cumulative deposit of glass coating or the like over underlying metal. Such coatings usually are carried over all interior surfaces of the vessel, and, strictly continuously, through the tubular portions and out over or substantially over the flange face portions of nozzles; high into the necks and usually out over the edges and outer flange faces of the necks of manholes, and the like.

Any damage to the reactor vessel which results in a discontinuity in the glass or ceramic coating at a point where or in such manner that the exposed metal may come into contact with reactive chemical substances, is inadmissible. Hitherto, seriously damaged reactor vessels have been disused, oftentimes to the great inconvenience of the using facility, since such disuse may back up to supply sources and the like and may idle substantially larger parts of an integrated chemical operation or the like than the disused vessel itself; the disused vessel can oftentimes be shipped to the factory where repairs of any magnitude can be accomplished. Replacing and reglassing only a nozzle has been impractical because heat of welding on the nozzle usually causes the glass or ceramic lining to expand at a rate different from that of the metal beneath, and thus usually enlarges the broken area. It is known to deglass the vessel, to remove a broken or damaged nozzle and to replace it with an intact nozzle; and thereafter to reglass the entire structure. Not only are the costs of such a procedure very great, sometimes attaining to two thirds of the cost of a new vessel; but the disuse time causes a severe handicap. It is desired to be able to repair at least a nozzle or portion of a nozzle that has sustained severe damage, by on-the-site repair.

2. The Prior Art

Various inside-outside nozzle shields for repair in the instance of broken glass coating are known. Representative such shields appear in U. S. Pat. Nos. 3,010,601, 2,714,470, 2,725,159, British Pat. 707,188, and German Pat. 943,160. These and related structures are illustrated in "Operation, Maintenance and Repair of Pfaudler Glassed-Steel Equipment", in loose-leaf form, published by Pfaudler Permutit Inc., Pfaudler Division, Rochester 3, New York: note section 3, pages 15–19.

DESCRIPTION OF THE PRESENT INVENTION

The understanding of the present invention is made simpler by reference to the drawings.

FIG. 1 indicates a damaged nozzle in situ;

Now, the figures will be examined in more detail.

Figure 1:
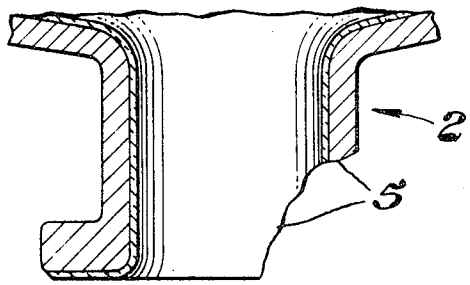
Figure 2:
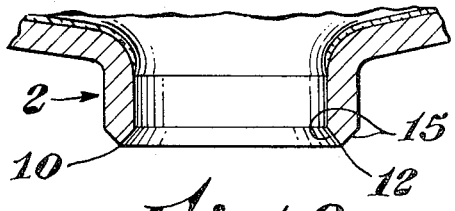
FIG. 2 represents the same nozzle after cutting and finishing to permit welding on of a repair piece.

Generally, FIG. 1 illustrates a damaged nozzle 2. The damage 5, indicated in the drawing is representative only, and the exact nature of the damage is not critical to this invention so long as it is confined to the nozzle. As a first step in preparing the repair of this invention, glass nozzle lining is removed, as by careful grinding, for some distance from the damage and beyond a line at which the nozzle is to be removed. This is done to prevent propagation of cracks from thermal expansion during torch cutting. If not done, such cracks may invade presently intact portions of the vitreous vessel lining, although by wet rag packing adjacent the cut, the problem can be minimized. Then the nozzle 2 is cut off as is shown in FIG. 2 at 10 above the point of damage and the resulting circular edge 12 of the nozzle tube is finished to a taper that is usually a bilateral taper 15 as is characteristic in preparation of a thick section for welding. This is shown in FIG. 2. The manner in which the cut is effected or the taper produced is immaterial and lies within the skill of the art. Routinely, cutting will be accomplished with a cutting torch and tapering will be accomplished by grinding.

Figure 3:
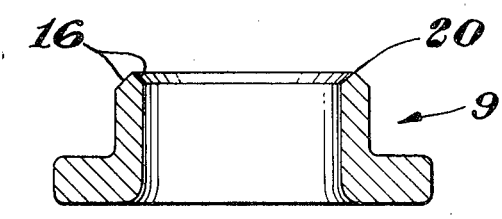
FIG. 3 illustrates the repair piece needed to cooperate with the cut and finished nozzle of FIG. 2, to be welded into place.
Figure 4:
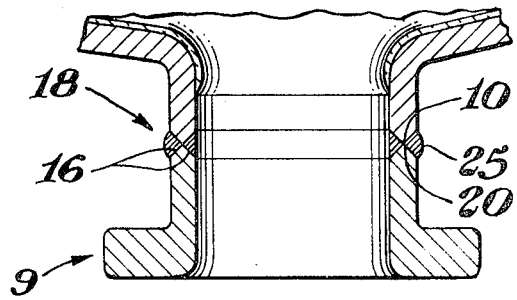
FIG. 4 shows the nozzle with the repair piece welded into place and the interior aspect of the weld bead and slag finished smooth.

There is supplied a replacement piece 9, appropriate dimensions of which are coextensive with the corresponding dimensions of the remaining, substantially undamaged portion of the nozzle. This is illustrated in FIG. 3, in which it will be seen that the approaching tube edge 20 of the replacement piece is produced as a taper 16 as is the remaining nozzle neck, to facilitate welding in fairly thick section. FIG. 4 illustrates the nozzle the structural portions of which, but not the vitreous lining, have been repaired, by welding together the replacement piece and the remaining nozzle neck. Welding bead or slag or both on the interior surface of the nozzle tube is removed or substantially removed to achieve a conforming surface. Welding bead 25 on the exterior may be left at the discretion of the person supervising the repairs.

The nozzle which has at this juncture been structurally repaired is now provided with a corrosion-resistant liner and cover in the form of a heavy metal sheath.

Figure 5:
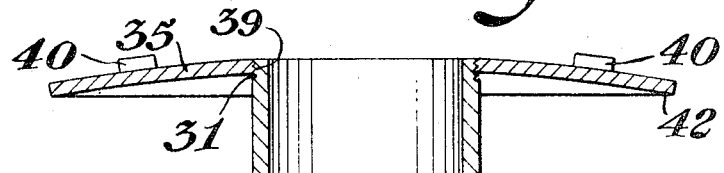
FIG. 5 shows, assembled, a three-part repair sheath in the condition in which it is found in the finished repair.

The identity of the metal chosen to form the sheath of FIG. 5 will depend upon cost and the exposure anticipated; nickel, stainless steel, various proprietary corrosion-resistant materials such as Monel and Inconel, tantalum if available in thick enough section, platinum and various other metals are eligible. Nickel or a stainless steel will usually be the metal of choice in view of the necessity for structural strength as will later appear. It is noted that the main body of the metal nozzle interior cover is composed of three pieces, a cylindrical tubular portion 30 to each end of which a circular disc is attached by threads; with nuts 40 attached to the disc 35 interior to the vessel. These three pieces are of metal stock of which the thickness may vary, depending upon service, from one-eighth to one-half inch in thickness.

The repair disc 45 exterior to the reaction vessel is provided with radial notches 50 to accommodate a spanner wrench by the use of which to secure the repair metal piece into place.

Figure 6:
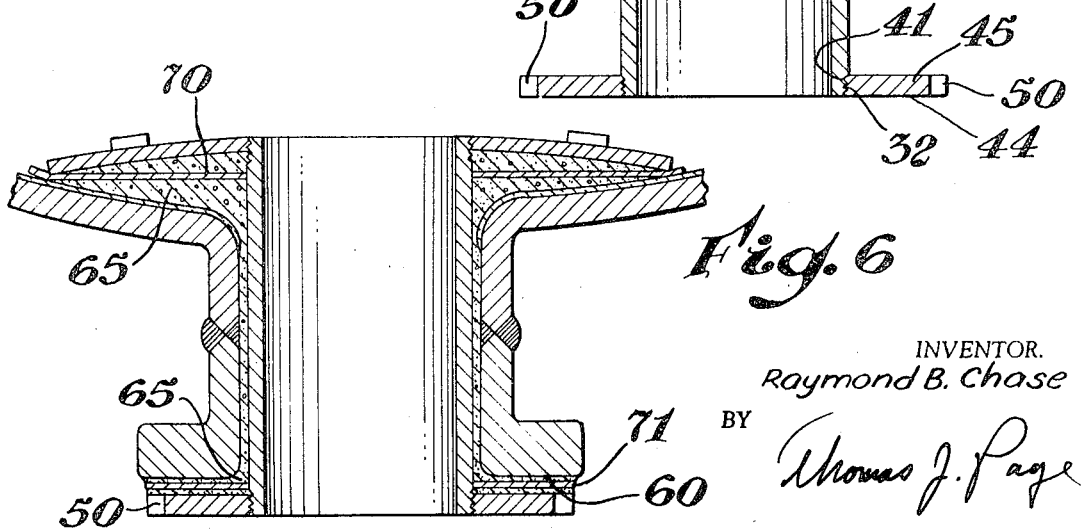
FIG. 6 shows the finished, sheathed repair.

FIG. 6 indicates, in a general way, the completed repair; it should be understood that all dimensions are illustrative only, although they are believed to be illustrated in substantially good proportion one to another.

Referring now to the drawings in more detail, FIG. 1 illustrates damage 5 to a nozzle 2 as by the breaking off of a portion of the nozzle substance. Damage of this kind occasionally occurs when large reactor vessels are being located into operating position by the use of power machinery, when, in some misadventure, the nozzle 2 inadvertently strikes some stoutly resisting structure. Also, damage of this kind can occur by merely severely bending the nozzle structure without physically removing a portion of it; the severely bent nozzle is not more usable than one of which a portion has been broken away. Damage of such degree also occasionally occurs from, for example, an acid leak, misapplication of a welding torch; or in other ways.

The most common cause of such nozzle damage is vibration that occurs incident to the routine use of the vessel, as when contents are steamed under steam pressure, or vacuum emptied, or when high energy mechanical transients arise from discontinuities in the vapor-water interface in steam lines ("-bumps").

When such vibration is a routine problem, the nozzle repair of this invention is preferred; and the necessary thickness of the metal stock is related to the ability of the resulting repaired structure to withstand such heavy vibration and remain intact and leak-free. Thus, in systems that are vibration-free or nearly so, a conventional repair of sheet metal such as tantalum, of, routinely, 0.060 or thinner, such as 0.030 thickness, suitably applied, may suffice. This invention finds its representative application in high-vibration or other shock exposure.

In making the repair, the damaged portion of the nozzle is deglassed, as noted, and then removed, to obtain a remaining portion, however diminished, which is structurally sound and dimensionally true as to major metal parts. In FIG. 2, it is illustrated that the nozzle 2 has been removed at about the midpoint of the neck. Such removal usually suffices; however, if necessary, the nozzle can be removed all the way to the body of the reactor vessel or for a small distance up the wall of the reactor vessel immediately adjacent the nozzle. In any event, the remaining edges 12 are produced as a taper 15, substantially as shown in FIG. 2, to facilitate welding a section of the thickness of a typical reactor vessel or nozzle wall.

It will be apparent that the replacement piece 9 illustrated in FIG. 3 is illustrative only; actual dimensions and shapes, will depend upon the extent and nature of the removal of original nozzle structure. When only the outer flange has to be removed, a replacement outer flange will usually suffice; when removal extends as far as the body of the reactor vessel, a larger repair piece is provided.

The manner of providing the repair piece lies outside the present invention; in some manners, patterns are prepared, and sand molds formed, and the ferrous metal, typically a steel, cast into the mold; in another way, from a disused reactor vessel a sound nozzle of coextensive dimensions is removed as by cutting, it is deglassed if need be, and its edges 16 tapered to approach the tapered edges 15 of the remaining nozzle portion 2 on the vessel.

The replacement piece 9 is approximated to the remaining vessel structure; and the two are welded together in any desired technique. Usually, when available, electric welding will be preferred over gas welding, since usually electric welding does not require heating so extensive a site. The manner of welding is not part of the present invention.

When the weld is completed, if slag or surplus bead 25 appear above the conforming interior surface level of the nozzle, they are removed to conformity or to slightly more than conformity, as by grinding and the like. FIG. 4 illustrates the finished weld 18 with interior bead substantially conforming.

It should be understood that, as illustrated in FIG. 4, the structurally substantially complete nozzle has incomplete ceramic coating over surfaces thus routinely protected. There remains, thus, the function of providing protection for otherwise exposed ferrous surfaces, such protection extending to and joining remaining ceramic or glass coating of the vessel interior.

A structure is provided as illustrated in FIG. 5. It will be discerned that the structure is fabricated in substantially three pieces. The manner and art of its fabrication are outside the present invention, and draw upon the metal working arts generally.

The cylindrical interior nozzle wall is covered by a cylindrical metal sheath 30, the outer wall of the ends of which are threaded 31, 32 to cooperate with mating threads 39, 41, provided in openings of repair discs. There is provided an interior repair disc 35, the outer diameter of which is great enough to cause it to extend radially far enough to overlie and engage undamaged ceramic or glass vessel lining. The said disc is provided with a central opening to fit the repair sheath tube and provided with interior threads 39 to cooperate with the provided threads 31 on the said tube 30.

There is provided also an exterior repair disc 45 of diameter sufficient that it covers and sheaths the exterior flange face 60 of the nozzle under repair and provided with a central opening to fit the end of the tubular nozzle interior repair sheath 30 and threaded 41 to cooperate with the provided threads 32 on the tubular portion 30. As noted, the metal stock of which repair discs 35 and 45, and cooperating tubular portion 30 are to be made is to be of the thickness from one-eighth to one-half inch.

As here shown, and as much preferred, the interior disc 35 is shown to be domed; that is, when lying on a flat surface, it rests upon such surface by the lower aspect of its outer edge 42 and, as it proceeds radially inwardly therefrom, rises above the surface. This manner of fabrication prestresses the structure to provide greater strength in engaging a gasket and through the gasket the ceramic surface with which it is to form a chemically integral part. Also as here shown and as preferred, the said domed interior repair disc is provided with nuts 40 of metal of the same identity as the disc 35 itself held into place by welds. Openings from the nuts 40 through the repair disc 35 are not provided; it is not contemplated that any threaded structure will pass through the nuts 40 and attempt to pass through the accompanying disc 35. The nuts 40 are provided, rather, as a means by which temporarily to engage holding means (not shown) such as a wrench by means of which to hold the disc 35 stationary as the tubular sheath portion 30 is affixed to it by means of the provided cooperating threads 31, 39 or, conversely, to turn the interior repair disc 35 as the tubular portion 30 is held still or is counter rotated. When this function has been completed, any threaded structure, such as a bolt or stud engaging said nuts 40 is expected to be removed and taken out of service permanently.

To permit engaging the outer repair disc 45 that overlies the flange face 60 of the nozzle there are usually provided radial slots 50; that the outer surface 44 of the said disc 45 be flat and true to a close approximation, to cooperate with a gasket in mating with a mating nozzle flange face for attachment purposes is indispensible; the surface feature of the nuts 40 is thus inadmissible on the outer disc face 44. One or more radial slots 50 of position and dimension necessary to cooperate fully with a spanner wrench permit performing the same function on the exterior.

As is indicated in FIG. 6, the nozzle repair sheath of this invention is affixed into place and put into service by the cooperating use of a curable resin 65 and by gaskets 70, 71 also. Both resin and gasket material are of substances substantially insoluble and otherwise chemically inert under the conditions of service intended. Modest flexibility and shock resistance, but not elastomery, in the cured resin are desirable, to minimize fractures of the resin from vibrations and the like. Such materials lie within the skill of the art and, of themselves, are not part of this invention. The gaskets 70, 71, will usually be double walled gaskets the outer surfaces of which are of polytetrafluoroethylene, the interior voids of which are occupied, at least in substantial part, by deformable expanded metal structures the deformation of which in service provides secure engagement for the cooperating surfaces. The resin 65 can be of the furan type, can be of the arylol aldehyde type, or can be epoxy resin. To assure sound bonding and freedom from voids, the uncured, typically pasty, viscous, adhesive resin 65 is applied as a coating or "butter" over all nozzle and reactor vessel surfaces with which the present repair sheath is to cooperate, namely, the outer flange face 60, the tubular interior, and the vessel interior wall surfaces adjacent the tubular interior of the nozzle, substantially as shown in FIG. 6. Such "butter" is applied prior to the positioning of gaskets 70, 71. Routinely, the gasket surfaces themselves also are similarly coated. The surfaces of the repair sheath that are to face and cooperate with "buttered" surfaces of the nozzle and adjacent vessel wall are also coated with the uncured curable resin material. In this situation, then, the nozzle repair sheath is assembled in the position in which it is to be used.

The exact sequence or manner of assembly is not critical; usually it will be preferred to affix the outer repair disc 45 lightly by means of provided screw threads 41, 32 to its end of the tubular nozzle interior sheath structure 30, to place the resin-coated gasket in position on the interior, that is to say the nozzle-flange-facing surface of the said disc; then to introduce the tubular portion 30 into the resin-coated neck of the nozzle, and loosely and approximately to seat the outer repair disc 45 and interior nozzle tubular sheath 30.

In this situation, then, with vessel interior walls adjacent the repaired nozzle coated with resin, the resin-coated gasket 70 of the vessel interior is positioned around the interiorly-protruding neck of the tubular sheath portion 30, and the interior repair disc 35 with its repair-facing surface coated with curable but uncured resin 65 is then slipped into place and lightly threaded onto the cooperating threads of the nozzle tubular sheath portion. The interior disc 35 is readily engaged by means of studs or bolts (not shown) lightly threaded into the provided nut or nuts 40. It is usual experience that a reactor vessel of which a nozzle is repaired according to the present invention is either large enough that a repair service man can climb into the vessel and hold and otherwise manage the interior repair disc 35 in cooperation with another man outside working the exterior portions; or the vessel is small enough that a person outside it can reach in and, by hand, without entering the vessel manage the interior disc 35. When neither of these conditions pertains, management of the interior disc 35 is readily accomplished, by means of bolts and the like in the provided nuts 40, with a long pole (not shown) provided, it may be, with wrench means or a transverse bar at its end or the like.

In the situation described, then, the repair is loosely assembled in place. The curable resin 65 should be applied uniformly enough and in sufficient abundance that at least small amounts of it are extruded from and issue beyond the immediate work site indicating overflow of the curable resin.

The completion of the repair may be accomplished in any desired manner. In a preferred manner, once the parts have been loosely and approximately assembled together, the interior repair disc 35 will be securely seated by threading it further onto the provided threads 31 of the tubular nozzle interior repair member 30, until a conforming surface is attained where the tubular member 30 extends through and faces uniformly with the interior surface of the interior repair disc 35. In this situation the outer repair disc 45 should not yet be securely seated although it may be firmly at rest against the incompletely deformed deformable gasket 71.

With the inner repair disc 35 in this condition and held against rotation, the outer repair disc 45, by means of a spanner wrench engaging the provided radial notches 50, is tightened home. That is to say, the outer repair disc 45 is threaded onto the tubular interior repair sheath 30 very securely so as to deform both interior and exterior gaskets 70 and 71 and provide a secure cooperating fit of the domed interior disc 35 against the vessel interior wall and of the outer flange face repair disc 45 against the flange face 60. It is noted that such tightening is nearly to the spalling pressure of glass or ceramic lining. As this final tightening takes place further portions of filler resin usually extrude at the circumferential edges of interior and exterior discs. When tightening has been completed—or along the way if desired—surplus curable uncured resin 65 is removed. This is readily accomplished by means of rags which can, if desired, bear a small amount of solvent for the uncured resin. Resin removal should leave a smooth obstruction-free surface with only a small portion of the by now fully deformed gasket 70, 71 projecting; and the resin should form a complete seal of all exposed surfaces and edges of the repair. In this situation, then, the resin 65 is cured. Many resins cure at ambient temperatures with the passing of only a modest amount of time by reaction of components of which, just prior to application, they are assembled. Other resins require the application of superambient temperatures, as by means of heat lamps and the like. When the resin has been fully cured, the repair is complete and the repaired nozzle is then place into service as usual.

It is noted that a repair made in the indicated manner can be made and installed, when desired, of tantalum despite the severe difficulties that attend the working of this metal.

I claim:

1. Nozzle repair structure comprising essentially a flat outer disc and a domed inner disc and a tubular member therebetween, said discs and said tubular member being of a corrosion resistant metal, each such disc and tubular member being formed of metal stock that is from one-eighth to one-half, both inclusive, inches thick, the tubular member bearing male threads at each end on its exterior wall and each said disc defining a substantially central opening female threaded interiorly and of a size to mate with the provided said male threads, the said flat disc being of a diameter to overlie a nozzle flange and being provided with radial slots to engage a wrench; the domed interior disc being of a diameter to overlie any damaged wall interior portion of the reactor vessel of which the nozzle under repair is part and being provided with means for temporarily holding the said disc against rotation; the said tubular portion being of a length to pass from the exterior of the nozzle to the interior of the vessel of which the nozzle is a part and to receive the said discs.

2. Repair structure of claim 1 wherein said metal is tantalum.

3. Method of repairing a damaged ceramic-lined reactor vessel nozzle which comprises the steps of
   a. deglassing adjacent surfaces and cleanly cutting away damaged portion of the said nozzle together with enough adjacent undamaged portion to achieve a uniform remaining wall portion,
   b. preparing edges of the thus-cut nozzle for welding,
   c. providing a repair piece substantially codimensional with the original, undamaged structure and affixing it by welding and thereafter bringing the interior surface of the resulting structure to a uniform surface, whereby the undamaged form of the nozzle is restored, defining an interior vessel wall opening and an exterior flange face opening and a tubular member therebetween;
   d. coating surfaces to be repaired with a curable resin which, when cured, is insoluble and chemically substantially inert under conditions to be employed,
   e. providing a deformable interior and a deformable exterior gasket, coating them on all surfaces with a curable resin which when cured is inert and insoluble, and positioning these gaskets circumferentially around said interior vessel wall opening and said exterior flange face opening;
   f. providing a nozzle repair structure comprising essentially a flat outer disc and a domed inner disc and a tubular member therebetween, each of said discs and said tubular member being of metal stock that is from one-eighth to one-half, both inclusive, inches thick; the tubular member bearing male threads at each end on its exterior wall and each said disc defining a substantially central opening female threaded interiorly and of a size to mate with the provided said male threads, the said flat disc being of a diameter to overlie a nozzle flange and being provided with radial slots to engage a wrench; the domed interior disc being of a diameter to overlie a damaged wall interior portion of the reactor vessel of which the nozzle under repair is part and being provided with means for temporarily holding the said disc against rotation; the said tubular portion being of a length to pass from the exterior of the nozzle to the interior of the vessel of which the nozzle is a part and to receive the said discs;

g. coating facing surfaces of said discs with further portions of said curable resin, h. positioning said domed interior disc and cooperating tubular member lightly into place interiorly of vessel to be repaired and lining the nozzle structure, i. positioning said flat outer disc over flange face surface and cooperating gasket and lightly engaging all cooperating threads, j. tightening all threads to secure said discs firmly into place with deformation of said gaskets, k. striking extruded excess curable resin to obtain a smooth, impervious surface and l. curing said resin.

* * * * *

O-1050
(5/69)

UNITED STATES PATENT OFFICE
CERTIFICATE OF CORRECTION

Patent No. 3,651,558　　　　　　　　　Dated  28 March 1972

Inventor(s)  Raymond Burt Chase

It is certified that error appears in the above-identified patent and that said Letters Patent are hereby corrected as shown below:

In the third line from the bottom of the ABSTRACT insert --inert-- between the words "chemically" and "gaskets".

Signed and sealed this 5th day of September 1972.

(SEAL)
Attest:

EDWARD M. FLETCHER, JR.
Attesting Officer

ROBERT GOTTSCHALK
Commissioner of Patents